US008613069B1

(12) United States Patent
Martini

(10) Patent No.: US 8,613,069 B1
(45) Date of Patent: Dec. 17, 2013

(54) PROVIDING SINGLE SIGN-ON FOR WIRELESS DEVICES

(71) Applicant: Phantom Technologies, Inc., San Diego, CA (US)

(72) Inventor: Paul Michael Martini, San Diego, CA (US)

(73) Assignee: Phantom Technologies, Inc., San Diego, CA (US)

( * ) Notice: Subject to any disclaimer, the term of this patent is extended or adjusted under 35 U.S.C. 154(b) by 0 days.

(21) Appl. No.: 13/897,333

(22) Filed: May 17, 2013

(51) Int. Cl.
*G06F 7/04* (2006.01)

(52) U.S. Cl.
USPC ............................ 726/8; 455/410; 455/411

(58) Field of Classification Search
USPC .............. 726/8, 2–4, 9, 10, 12; 455/410, 411
See application file for complete search history.

(56) References Cited

U.S. PATENT DOCUMENTS

| 6,453,353 | B1 * | 9/2002 | Win et al. | 709/229 |
| 8,156,338 | B1 * | 4/2012 | Morris | 713/172 |
| 8,359,271 | B2 * | 1/2013 | Peckover | 705/50 |
| 8,478,828 | B2 * | 7/2013 | Craig et al. | 709/206 |
| 2012/0214444 | A1 * | 8/2012 | McBride et al. | 455/411 |
| 2013/0061307 | A1 * | 3/2013 | Livne | 726/7 |
| 2013/0111572 | A1 * | 5/2013 | Gaddam et al. | 726/7 |

OTHER PUBLICATIONS

'Wikipedia' [online] "HTTP 302," 2013, [retrieved on May 9, 2013]. Retrieved from the Internet: <URL: http://en.wikipedia.org/wiki/HTTP_302> 2 pages.

\* cited by examiner

*Primary Examiner* — Nirav B Patel
(74) *Attorney, Agent, or Firm* — Fish & Richardson P.C.

(57) ABSTRACT

Technologies for wireless device authentication are disclosed. A described technique includes intercepting, at a gateway device, data from an originating device, the data including a request for a uniform resource locator; determining whether the originating device is a wireless device; determining whether the originating device is in an authenticated state relative to the gateway device; if the originating device is a wireless device and is not in the authenticated state, sending data to the originating device, the data including a uniform resource locator redirection command to cause a browser executing on the originating device to launch an authentication application for authenticating the originating device relative to the gateway device by providing user-specific credential information to the gateway device; receiving the user-specific credential information from the originating device; and marking a network address of the originating device as being in the authenticated state based on a successful authentication.

24 Claims, 7 Drawing Sheets

PROVIDING SINGLE SIGN-ON FOR WIRELESS DEVICES

FIELD

This patent document generally relates to wireless device authentication.

BACKGROUND

Network access controllers can be installed within corporate and other networks for controlling access to network resources. Further, users may be required to authenticate to a proxy server prior to accessing the Internet. One widely used authentication scheme is HyperText Transfer Protocol (HTTP) Basic Authentication (Basic Auth). In Basic Auth, a client sends its username and password in unencrypted plaintext to a server such as, for example, a proxy server. The server authenticates the client and subsequently allows the client access to other resources, such as the Internet. In some cases, an Internet Service Provider (ISP) can employ a redirection to steer a new user/device to a welcome website. Such a welcome website can include a mechanism for authentication. For example, a hotel may provide Internet services, but only after a user enters a secret code and accepts services terms via a welcome website.

SUMMARY

This document describes, among other things, technologies relating to wireless device authentication. In one aspect, a described technique includes intercepting, at a gateway device, first data from an originating device, the first data including a request for a uniform resource locator; determining whether the originating device is a wireless device; determining whether the originating device is in an authenticated state relative to the gateway device; if the originating device is a wireless device and is not in the authenticated state, sending second data to the originating device, the second data including a uniform resource locator redirection command to cause a browser executing on the originating device to launch an authentication application for authenticating the originating device relative to the gateway device by providing user-specific credential information to the gateway device; receiving the user-specific credential information from the originating device; and marking a network address of the originating device as being in the authenticated state based on a successful authentication of the user-specific credential information. Other forms of this aspect include corresponding systems, apparatus, and computer software encoded on a non-transitory computer readable storage medium.

These and other implementations can include one or more of the following features. Implementations can include receiving, from the originating device, a heartbeat message generated by the authentication application; and maintaining the authenticated state based on the heartbeat message. Implementations can include determining whether the heartbeat message indicates a different network address for the originating device, and marking the different network address as being in the authenticated state. The heartbeat message can include information associated with user-specific credential information. Determining whether the originating device is a wireless device can include accessing a user agent field of the request; and determining whether the user agent field indicates a wireless device category type. Determining whether the originating device is a wireless device can include determining whether the network address is a member of an address group assigned to a wireless local area network. A uniform resource locator redirection command can redirect the browser to a website for downloading the authentication application if the authentication application has not been previously installed on the originating device. An authentication application can be configured to operate in a background state on the originating device and to provide heartbeat messages to the gateway device to maintain the authenticated state. An authentication application can be configured to cache the user-specific credential information and to automatically provide the user-specific credential information in response to a subsequent uniform resource locator redirection command. User-specific credential information can include a username and a passphrase. Other types of credential information are possible. A network address is in accordance with an Internet Protocol (IP) such as IPv4 or IPv6.

In another aspect, a system can include a gateway device and an authenticator communicatively coupled with the gateway device. The gateway device can be configured to intercept first data from an originating device, the first data including a request for a uniform resource locator, determine whether the originating device is a wireless device, determine whether the originating device is in an authenticated state relative to the gateway device, and if the originating device is a wireless device and is not in the authenticated state, send second data to the originating device, the second data including a uniform resource locator redirection command to cause a browser executing on the originating device to launch an authentication application for authenticating the originating device relative to the gateway device by providing user-specific credential information to the gateway device. The authenticator can be configured to receive the user-specific credential information from the originating device, and mark a network address of the originating device as being in the authenticated state based on a successful authentication of the user-specific credential information.

In another aspect, a system can include a gateway device configured to intercept first data from an originating device, the first data including a request for a uniform resource locator, determine whether the originating device is a personally-owned device, determine whether the originating device is in an authenticated state relative to the gateway device, and if the originating device is a personally-owned device and is not in the authenticated state, send second data to the originating device, the second data including a uniform resource locator redirection command to cause a browser executing on the originating device to launch an authentication application for authenticating the originating device relative to the gateway device by providing user-specific credential information to the gateway device. The system can include an authenticator communicatively coupled with the gateway device, configured to receive the user-specific credential information from the originating device, and mark a network address of the originating device as being in the authenticated state based on a successful authentication of the user-specific credential information. The gateway device can be configured to determine whether the network address is a member of an address group assigned to a subnet associated with personally-owned devices.

Particular configurations of the technology described in this document can be implemented so as to realize one or more of the following potential advantages. The techniques described herein may be implemented to provide single sign-on for wireless devices accessing an internal network. The techniques described herein may be implemented to track and maintain an authentication state despite changes to a device's assigned network address. Causing the installation of authentication application on a user's wireless device can eliminate the requirement of having a network administrator manually configure a user's personal device to access an internal network.

Details of one or more implementations of the subject matter described in this document are set forth in the accompanying drawings and the description below. Other features, aspects, and potential advantages of the subject matter will become apparent from the description, the drawings, and the claims.

BRIEF DESCRIPTION OF THE DRAWINGS

Like reference symbols in the various drawings indicate like elements.

DETAILED DESCRIPTION

With the recent proliferation of wireless devices, many network owners have adopted a Bring Your Own Device (BYOD) approach in which users can access internal and external networks using personal devices. A network administrator may need to identify the user of a BYOD, e.g., personally-owned devices such as a smartphone, cellphone, laptop, or tablet, for things such as applying network policy, granting access to resources, or data logging. The administrator may decide to restrict network access to one or more users. Thus, the administrator needs to know who is using a device in order to apply a restricted network access user policy.

A gateway, coupled between an internal network and the Internet, can be configured to identify and authenticate users of wireless devices. The gateway, for example, can determine that a user is unauthenticated when the user's wireless device attempts to access the Internet or a local resource via the internal network by sending a web request. The gateway can check one or more headers in a web request from the user's device or check whether the request originated from a wireless subnet to determine whether the device is a wireless device, which could potentially be a BYOD. The gateway can respond with an application install redirect to the unauthenticated wireless device. The application that is then installed by the user's device allows the user to enter credentials once, and store the credentials on the device so that the user does not have to enter credentials again. The next time the user's device accesses the internal network, the application is already installed and automatically reports the user credentials to the gateway such that the user is not prompted again for credentials.

Figure 1:
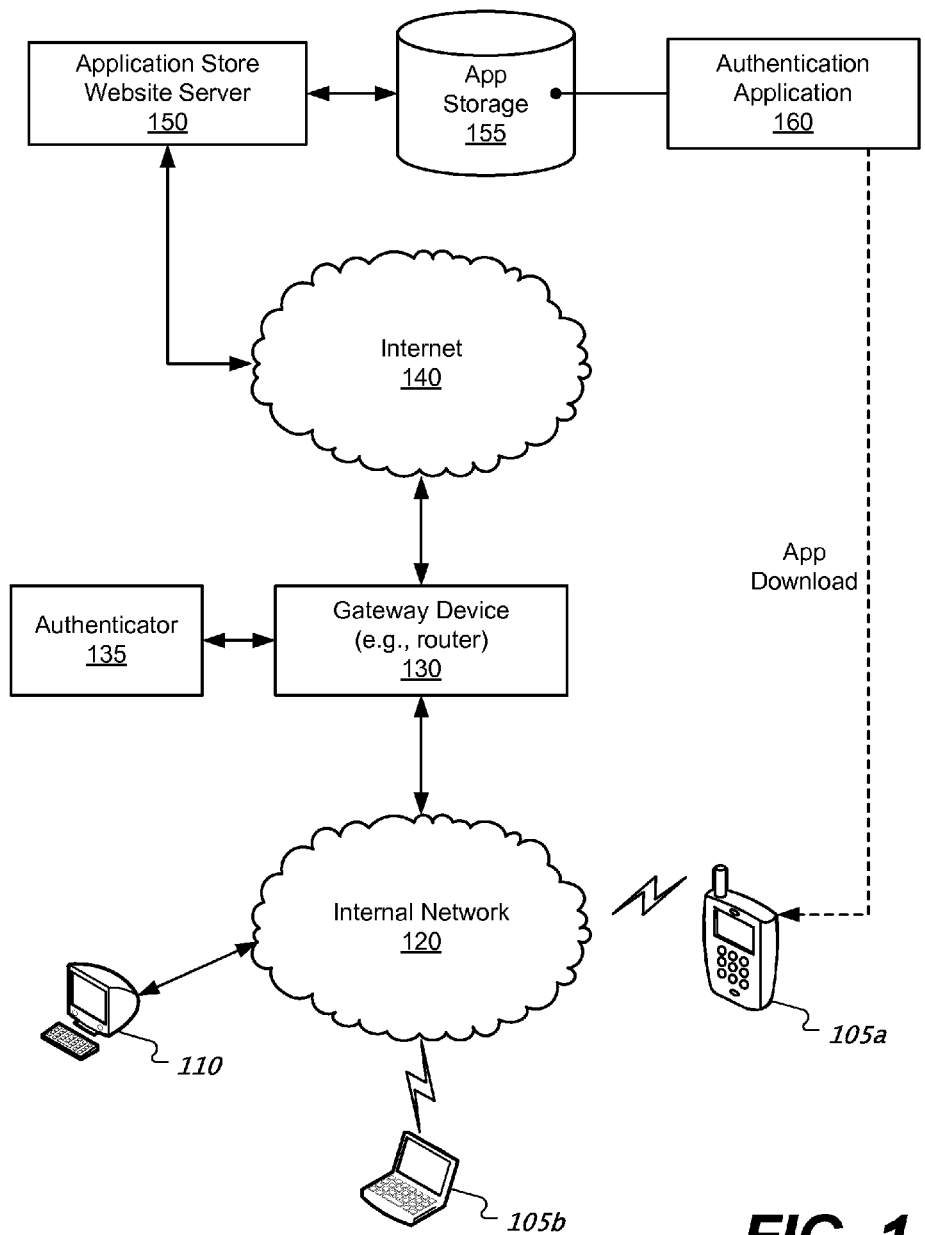
FIG. 1 shows a diagram of an example of a simplified network architecture.

FIG. 1 shows a diagram of an example of a simplified network architecture. A network owner can provide wireless network connectivity via an internal network 120. The internal network 120 can include a wireless local area network (WLAN). The WLAN can include one or more wireless access points to communicate with wireless devices 105a-b. The internal network 120 can include one or more wired interfaces to provide wired connectivity to devices such as a desktop computer 110.

The network owner can operate a gateway device 130 such as a router that manages traffic to and from the a public network such as the Internet 140. The gateway device 130 can communicate with an authenticator 135 that is configured to authenticate users of the internal network 120. In some implementations, the authenticator 135 provides an authentication service solely for devices that wirelessly communicate with the internal network 120. The authenticator 135 can include one or more processors and memories. For example, the authenticator 135 can include a memory such as a computer storage device to store user authentication records. In some implementations, the gateway device 130 includes the authenticator 135.

A server 150 can be configured to host an application store website. The application store website server 150 can provide applications for download to devices such as the wireless devices 105a-b. Such applications can be stored in an application storage 155. The server 150 can be communicatively coupled with an application storage 155. The application storage 155 can store various applications including an authentication application 160. The network owner can cause the authentication application 160 to be installed on the wireless devices 105a-b. The authenticator 135, for example, can cause the gateway device 130 to direct an unauthenticated device to download the authentication application 160 from the application store website server 150.

Figure 2:
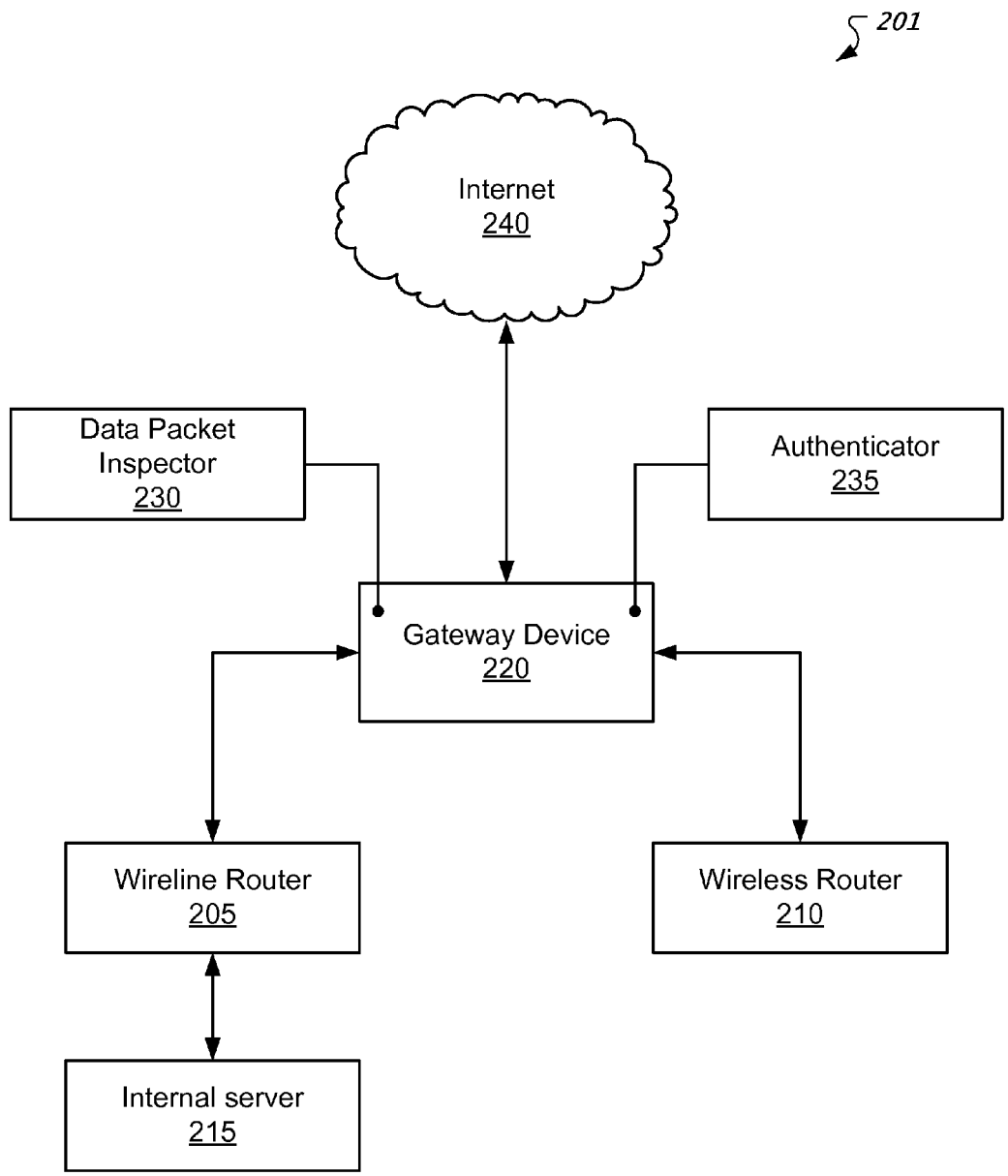
FIG. 2 shows a diagram of an example of a simplified network architecture associated with an internal network.

FIG. 2 shows a diagram of an example of a simplified network architecture associated with an internal network. An organization's internal network can include one or more wireline routers 205, one or more wireless routers 210 that form a WLAN, and one or more gateway devices 220. The internal network can include one or more internal servers 215, such as a payroll database server, employee intranet server, or e-mail server. Other types of servers are possible. A gateway device 220 can be configured as a conduit for communications with the Internet 240. The gateway device 220 can include a data packet inspector 230. The data packet inspector 230 can be configured to inspect packets to and from the internal network for compliance with one or more security policies established by the organization. The gateway device 220 can include an authenticator 235 to authenticate users and/or devices accessing the internal network. In some cases, the internal network can be accessed from the Internet 240 via a secure mechanism such as a virtual private network (VPN).

The gateway device 220 can detect whether a packet originated from a wired subnet (e.g., one provided by the wireline router 205) or from a wireless subnet (e.g., one provided by the wireless router 210) based on IP ranges assigned to those subnets. The gateway device 220 can apply different security policies based on a packet's detected subnet. Moreover, a user's wireless device can be provisioned for the internal network by having the device establish communications via the wireless router 210. The authenticator 235 can detect that the user's wireless device is not currently authenticated for the internal network, and cause the user's wireless device to download an authentication application to enable the wireless device for access on the internal network, provided that the user enters the correct credentials. In some implementations, once provisioned and authenticated with the authentication application, the wireless device can access the internal network from the Internet 240 when away from the office or the wireless router 210 when in the office.

Figure 3:
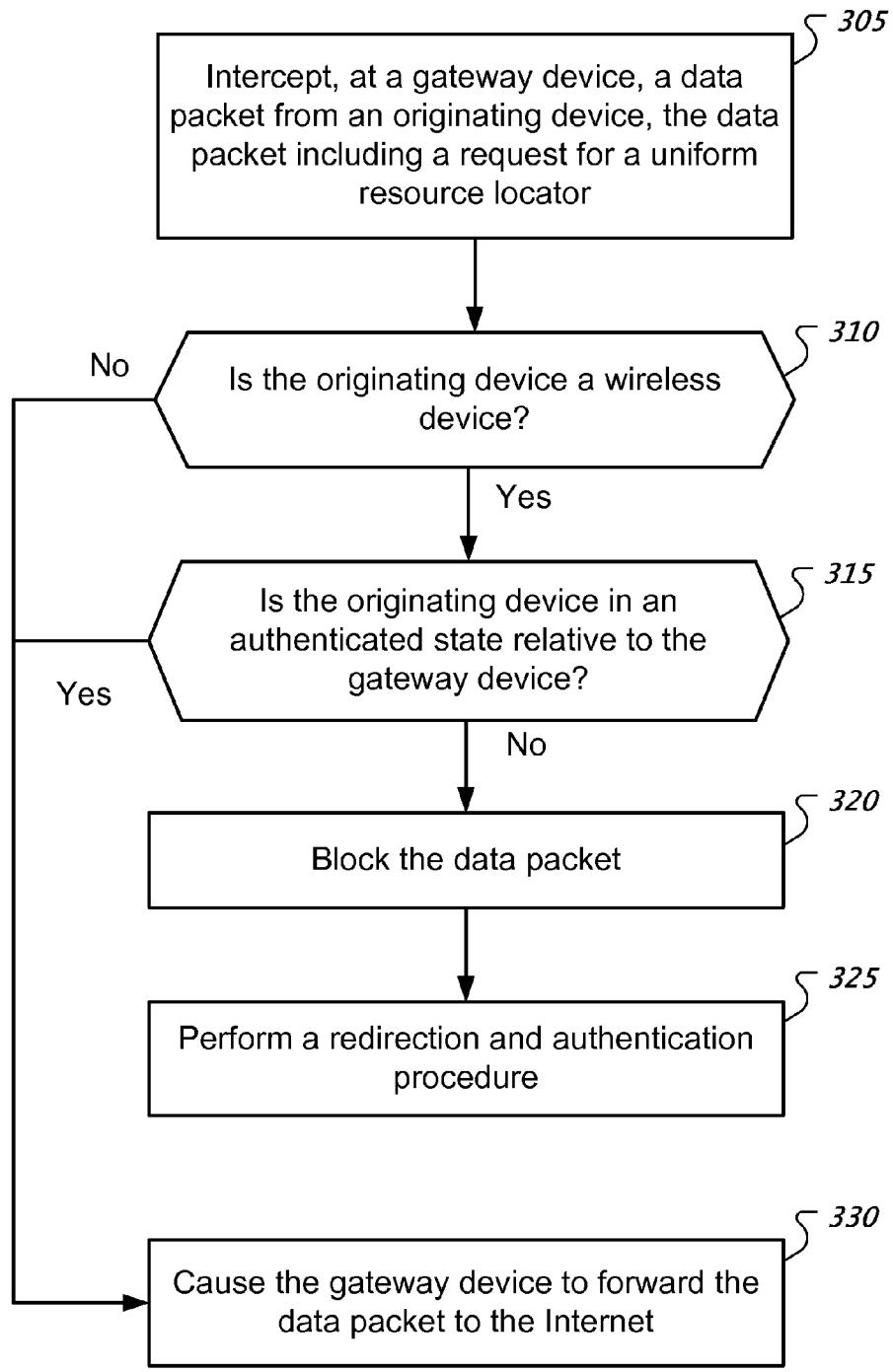
FIG. 3 shows a flowchart of an example of a process for handling data packets in accordance with an authentication policy.

FIG. 3 shows a flowchart of an example of a process for handling data packets in accordance with an authentication policy. At 305, the process intercepts, at a gateway device, a data packet from an originating device, the data packet including a request for a uniform resource locator (URL). At 310, the process determines whether the originating device is a wireless device. In some implementations, determining whether the originating device is a wireless device includes accessing a user agent field of the request, and determining whether the user agent field indicates a wireless device category type. In some implementations, determining whether the originating device is a wireless device includes determining whether the network address is a member of an address group assigned to a WLAN subnet. If the originating device is not a wireless device, the process, at 330, causes the gateway device to forward the data packet to the Internet. Forwarding can include outputting the data packet on an egress port. In some implementations, forwarding can include modifying a media access control (MAC) layer address of the data packet based on a MAC layer address of an egress port.

If the originating device is not a wireless device, the process, at 315, determines whether the originating device is in an authenticated state relative to the gateway device. Determining whether the originating device is in an authenticated state relative to the gateway device can include accessing an authentication database and querying for an authentication record associated with a network address of the originating device. If the originating device is in an authenticated state, the process, at 330, causes the gateway device to forward the data packet to the Internet. If the originating device is not in an authenticated state, the process, at 320, blocks the data packet, and at 325, performs a redirection and authentication procedure. An example of such a procedure is provided by FIG. 4 and its associated description. The gateway device can be configured to allow the wireless device to access any network destinations that are required to carry-out the wireless device's part in the redirection and authentication procedure.

Figure 4:
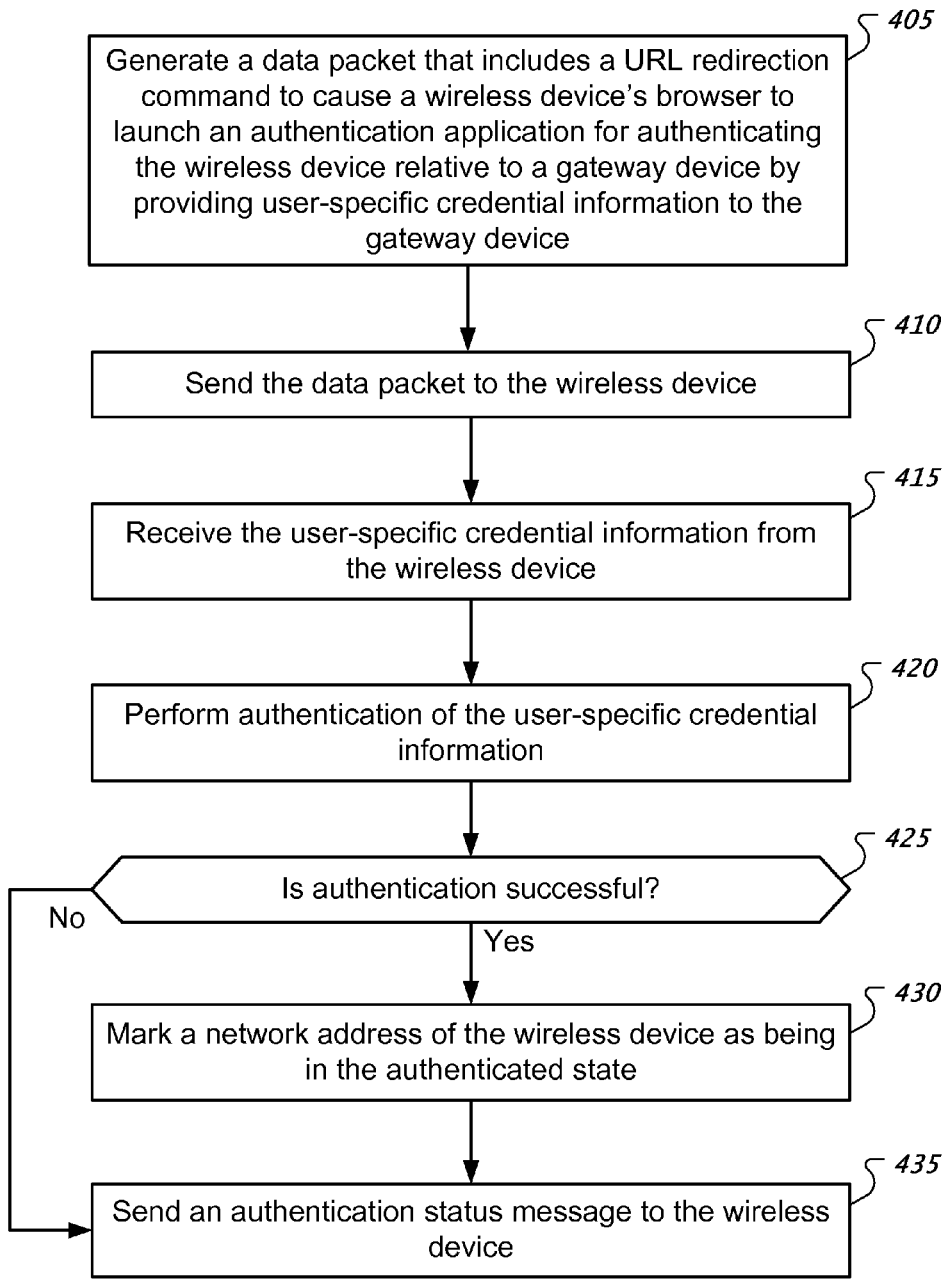
FIG. 4 shows a flowchart of an example of a process for performing a redirection and authentication procedure.

FIG. 4 shows a flowchart of an example of a process for performing a redirection and authentication procedure. At 405, the process generates a data packet that includes a URL redirection command to cause a wireless device's browser to launch an authentication application for authenticating the wireless device relative to a gateway device by providing user-specific credential information to the gateway device. In some cases, causing a wireless device's browser to launch an authentication application can include downloading and installing the authentication application. The redirection command can include an application identifier that corresponds to the authentication application. The redirection command can include a network address for an application store such that the wireless device can obtain the application from the application store. In some implementations, the URL redirection command is based on a Hypertext Transfer Protocol (HTTP) redirect.

At 410, the process sends the data packet to the wireless device. In response to the redirection command, the wireless device's browser can be redirected to an application store to download the authentication application if it is not installed. In some implementations, the application store can determine whether the wireless device already has the authentication application installed to avoid a duplicative download. In some implementations, the wireless device can determine whether or not the application identified in the redirection command is already installed.

At 415, the process receives the user-specific credential information from the wireless device. In some implementations, the user-specific credential information includes a username and a passphrase. In some implementations, the user-specific credential information includes biometrical data such as fingerprint scan data, iris scan data, voice data, an image-capture of a person using the wireless device, or a combination thereof. In some implementations, the user-specific credential information includes financial information such as a credit card number, if the wireless device is required to purchase network access.

At 420, the process performs authentication of the user-specific credential information. Performing authentication can include comparing one or more credentials received from the device with corresponding data within an authentication database. At 425, the process determines whether the authentication is successful. If unsuccessful, the process, at 435, sends an authentication status message to the wireless device that indicates an authentication failure. If successful, the process at 430 marks a network address of the wireless device as being in the authenticated state. Further if successful, the process at 435, sends an authentication status message to the wireless device that indicates an authentication success. The authentication status message can include a status identifier. In some implementations, the authentication status message can include an authentication token that uniquely identifies an authentication transaction. Sending an authentication status message can include sending information via a Short Message Service (SMS) or Transmission Control Protocol over Internet Protocol (TCP/IP).

In some implementations, the process, at 430, includes extracting an IP address of the wireless device from a source address portion of a data packet containing at least a portion of the user-specific credential information. Marking the network address of the wireless device, at 430, can include inserting the extracted IP address into a whitelist database based on a successful authentication. In some implementations, a whitelist database is a data structure such as a memory array, hash table, or linked list that stores network addresses, such as IPv4 or IPv6 addresses. Other types of data structures are possible. In some implementations, authentication related communications can occur over a secure mechanism, such as, for example, Secure Socket Layer (SSL) via HTTP Secure (HTTPS) or Transport Layer Security (TLS).

Once authenticated, the authentication application can be configured to cause a wireless device to provide heartbeat messages to the gateway device to maintain the authenticated state. In some implementations, the authentication application can be configured to operate as a background process to transmit heartbeat messages to the gateway device without distracting the user of the wireless device. In some implementations, the authentication status message can include an authentication token that uniquely identifies an authentication transaction. A heartbeat message can include user-specific credential information. In some implementations, a heartbeat message can include an authentication token associated with the user-specific credential information to avoid resending the user-specific credential information. Using such an authentication token, a gateway device can track the authenticated wireless device across different network addresses assigned to the wireless device, e.g., the source network address of a heartbeat message changes, but the authentication token remains the same.

Figure 5:
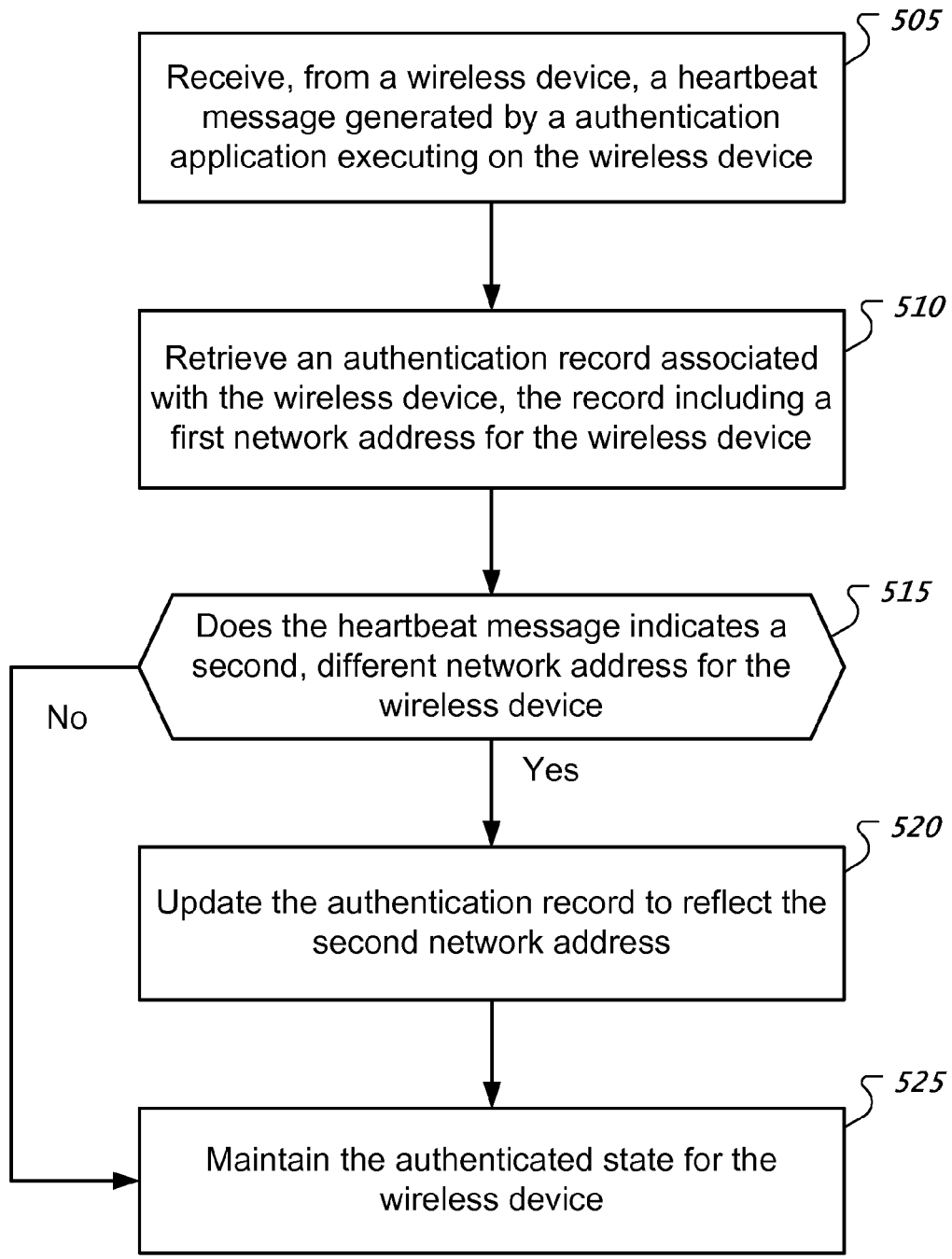
FIG. 5 shows a flowchart of an example of a process for handling heartbeat messages.

FIG. 5 shows a flowchart of an example of a process for handling heartbeat messages. The process, at 505, receives, from a wireless device, a heartbeat message generated by a authentication application executing on the wireless device. In some implementations, a device such as a gateway device intercepts a heartbeat message and forwards it to an authenticator. The process, at 510, retrieves an authentication record associated with the wireless device, the record including a first network address for the wireless device. Retrieving an authentication record can include accessing a database using information from the heartbeat message such as a network address, authentication token, or a combination thereof.

The process, at 515, determines whether the heartbeat message indicates a second, different network address for the wireless device. If it does not indicate a different address, the process, at 525, maintains the authenticated state for the wireless device. If it does indicate a different address, the process, at 520, updates the authentication record to reflect the second network address. Updating the authentication record can include overwriting the first network address with the second network address. In some implementations, updating the authentication record can include invalidating or removing a whitelist entry for the first network address and creating a new whitelist entry for the second network address. The process, at 525, maintains the authenticated state for the wireless device. Maintaining the authenticated state for the wireless device can include resetting a timer that, upon expiration, triggers a deletion of an authentication record. In some implementations, maintaining the authenticated state for the wireless device can include updating a timestamp field of an authentication record in response to a heartbeat message. A heartbeat message can be encrypted and/or transmitted via a secure layer such as SSL or TLS.

Figure 6:
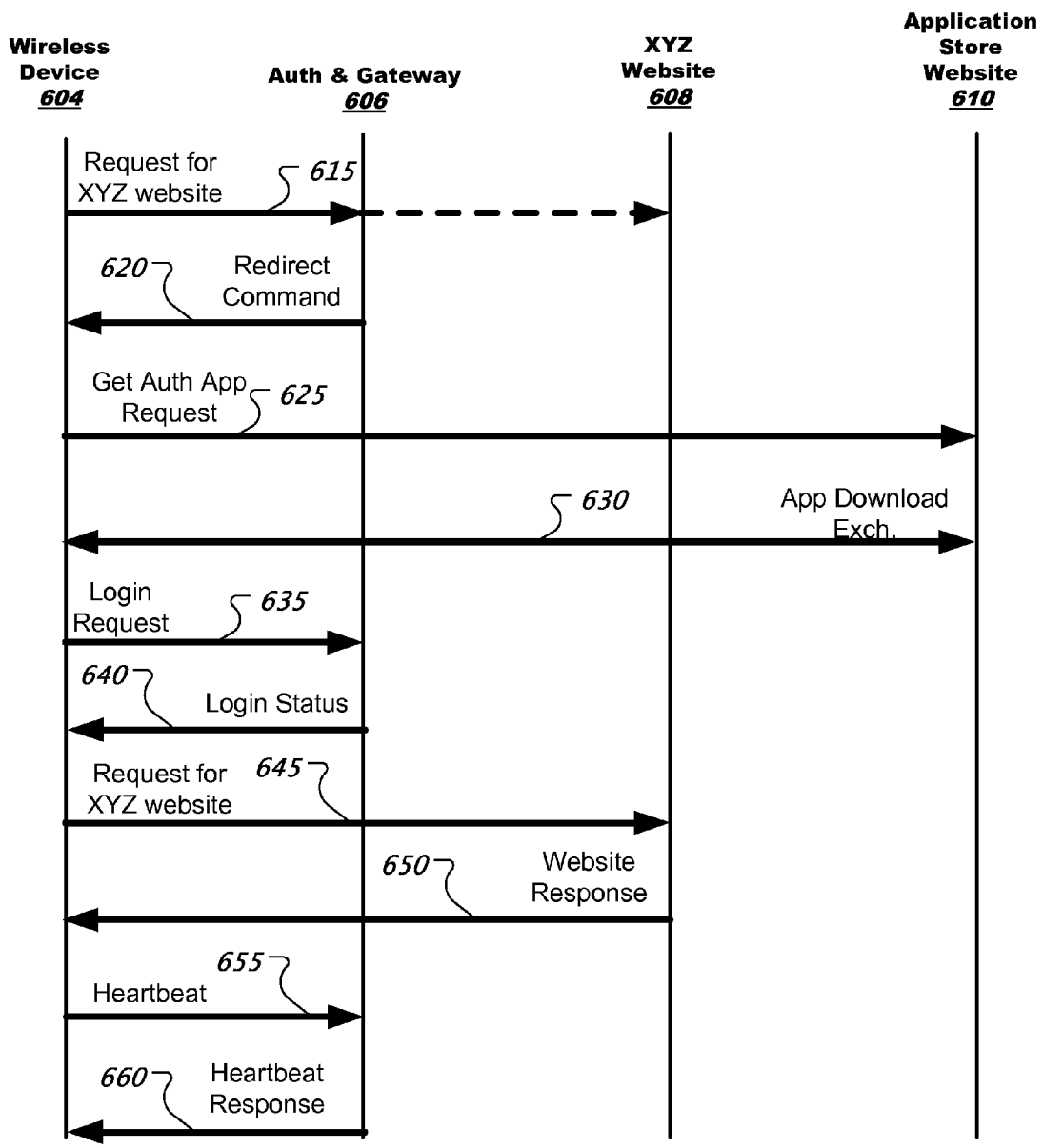
FIG. 6 shows a swim lane diagram of an example of interactions among networked components based on one or more authentication technologies described herein.

FIG. 6 shows a swim lane diagram of an example of interactions among networked components based on one or more authentication technologies described herein. At 615, the wireless device 604 sends a request for XYZ website. The wireless device 604, at 615, is in an unauthenticated state with the gateway 606. At 620, the gateway 606 sends a redirect command to the wireless device to cause the wireless device to launch an authentication application. In this example, the wireless device 604 does not yet have the authentication application, and the wireless device 604 uses the information from the redirect command to obtain the application from the application store website 610. At 625, the wireless device 604 sends a request for the authentication application to the application store website 610. At 630, the application store website 610 starts the authentication application download exchange with the wireless device 604.

After the download exchange, the wireless device 604 can use the authentication application to generate a login request. In some implementations, the authentication application can generate a pop-up window to solicit credentials from a user of the wireless device 604, and after their entry, send the credentials within the login request. At 635, the wireless device 604 sends the login request to the gateway 606. At 640, the gateway 606 sends a login status to the wireless device 604. Based on the login status including a login successful indication, the wireless device 604 sends a request for XYZ website at 645. The gateway 606 allows the request for XYZ website to go through since the wireless device 604 is now in an authenticated state.

At 650, the XYZ website sends a response to the wireless device 604. At 655, the wireless device 604 sends a heartbeat to the gateway 606. The gateway 606 renews the authenticated state associated with the wireless device 604 based on the heartbeat. At 660, the gateway 606 sends a heartbeat response to the wireless device 604. In some implementations, sending a heartbeat response is not required.

In an event where an authentication record times out, the gateway can intercept a URL request and send a subsequent redirection command to the affected wireless device. If the authentication application is already installed, the subsequent redirection command can cause the authentication application to respond automatically as to not require further input from a user. The authentication application, for example, can be configured to cache credential information provided by a user from an initial authentication. Cached credential information can be provided in response to subsequent redirection commands.

In some implementations, the request for XYZ website at 615 can include: "GET/news HTTP/1.1\\HOST: www.XYZ.com\\User-Agent: Android/Xyz." The redirect command, at 620, can include an HTTP status code 302 redirect. For example, the redirect command can include "HTTP/1.1 302 Found\\Location: authagent://10.129.35.6/agentcheckin." For such a redirect command, the prefix "authagent://" can be mapped to an authentication application such that the device knows to launch the authentication application, the network address of the gateway 606 ("10.129.35.6" in this example, other addresses are possible) is a parameter provided to the authentication application such that the application knows where to check-in, and "agentcheckin" is another parameter provided to the authentication application to instruct the application to perform the check-in which can include sending the login request at 635.

Figure 7:
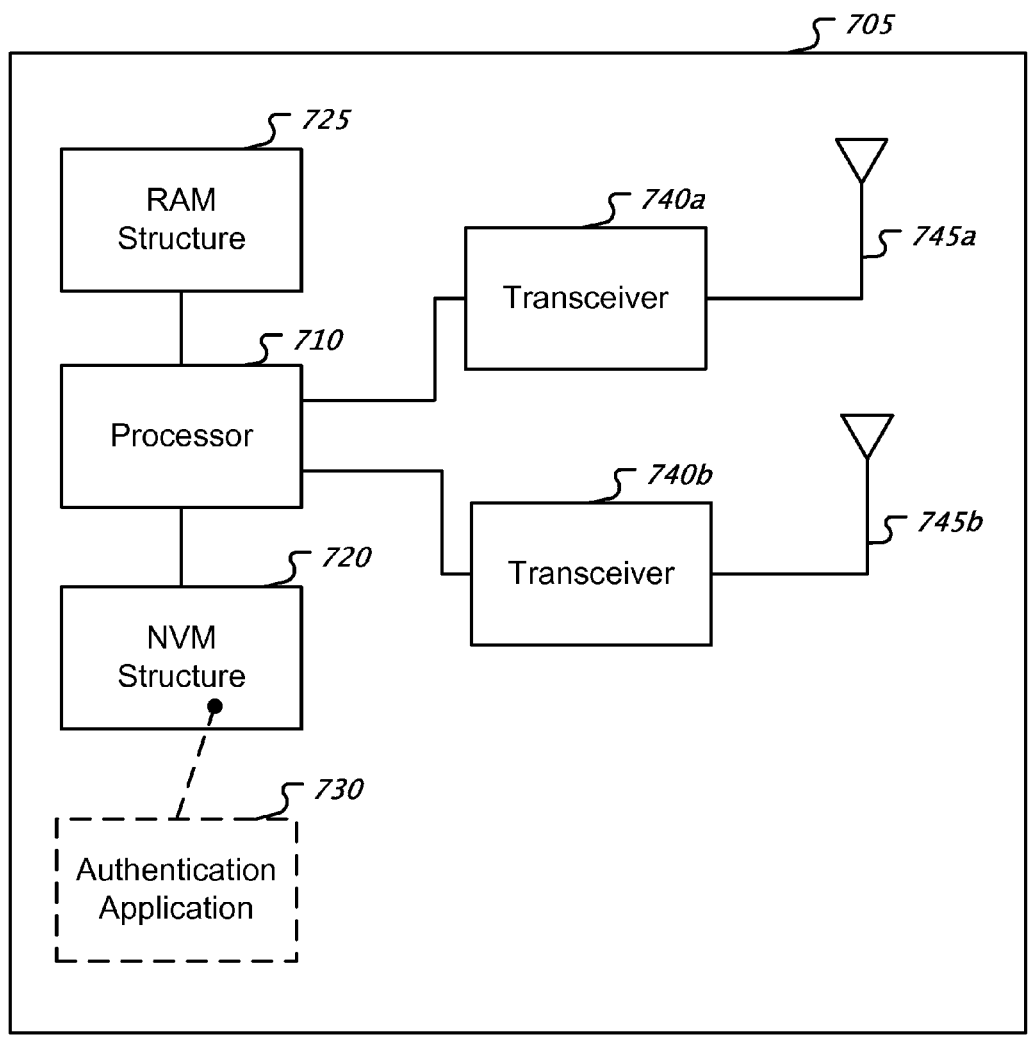
FIG. 7 shows a simplified architecture of an example of a wireless device that is configurable to store an authentication application.

FIG. 7 shows a simplified architecture of an example of a wireless device 705 that is configurable to store an authentication application 730. The wireless device 705 includes a processor 710, transceivers 740a-b, antennas 745a-b, a non-volatile memory (NVM) structure 720, and a random-access memory (RAM) structure 725. The NVM structure 720 stores software such as a wireless device OS and application software. The processor 710 can load software from the NVM structure 720 into the RAM structure 725, and can start to execute the software from the RAM structure 725. In some implementations, the processor 710 directly executes software from the NVM structure 720. In some implementations, the processor 710 includes multiple processor cores.

The wireless device 705 can send and receive data packets over one or more wireless interfaces. For example, the wireless device's processor 710 can send and receive data packets via one or more transceivers 740a-b and antennas 745a-b. Various examples of wireless interface technology include interfaces based on Long Term Evolution (LTE), Global System for Mobile Communications (GSM), IEEE 802.11a/b/g/n/ac, and Code Division Multiple Access (CDMA) technologies such as CDMA2000 and WCDMA. Other types of wireless interface technologies are possible. The wireless device 705 can download application software over one or more of these wireless interfaces and store the application software on a memory structure such as the NVM structure 720 or the RAM structure 725. In some implementations, the wireless device 705 includes a first interface for cellular-based communications and a second interface for WLAN based communications, where the first interface includes a transceiver 740a and one or more antennas 745a, and the second interface includes a transceiver 740b and one or more antennas 745b.

The wireless device 705 can be controlled by a redirection command to download an authentication application 730. The wireless device 705 can install the authentication application 730 on the NVM structure 720. In some implementations, the authentication application 730 exclusively uses a WLAN interface, rather than a cellular-based interface, for communications with a gateway device. In some implementations, the wireless device 705 can be assigned different network addresses for different interfaces. The authentication application 730 can use the network address associated with the WLAN interface in one or more authentication-related messages.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
intercepting, at a gateway device, first data from an originating device, the first data including a request for a uniform resource locator;
determining whether the originating device is a wireless device;
determining whether the originating device is in an authenticated state relative to the gateway device;
if the originating device is a wireless device and is not in the authenticated state, sending second data to the originating device, the second data including a uniform resource locator redirection command to cause a browser executing on the originating device to launch an authentication application for authenticating the originating device relative to the gateway device by providing user-specific credential information to the gateway device;
receiving the user-specific credential information from the originating device; and
marking a network address of the originating device as being in the authenticated state based on a successful authentication of the user-specific credential information.

2. The method of claim 1, comprising:
receiving, from the originating device, a heartbeat message generated by the authentication application; and
maintaining the authenticated state based on the heartbeat message.

3. The method of claim 2, wherein the network address is a first network address, and wherein the method comprises:
determining whether the heartbeat message indicates a second, different network address for the originating device, wherein the heartbeat message includes information associated with the user-specific credential information; and
marking the second network address as being in the authenticated state.

4. The method of claim 1, wherein determining whether the originating device is a wireless device comprises:
accessing a user agent field of the request; and
determining whether the user agent field indicates a wireless device category type.

5. The method of claim 1, wherein determining whether the originating device is a wireless device comprises:
determining whether the network address is a member of an address group assigned to a wireless local area network.

6. The method of claim 1, wherein the uniform resource locator redirection command redirects the browser to a website for downloading the authentication application if the authentication application has not been previously installed on the originating device.

7. The method of claim 1, wherein the authentication application is configured to operate in a background state on the originating device and to provide heartbeat messages to the gateway device to maintain the authenticated state.

8. The method of claim 1, wherein the authentication application is configured to cache the user-specific credential information and to automatically provide the user-specific credential information in response to a subsequent uniform resource locator redirection command.

9. The method of claim 1, wherein the user-specific credential information includes a username and a passphrase.

10. The method of claim 1, wherein the network address is in accordance with Internet Protocol (IP) version 4 or version 6.

11. A system comprising:
a gateway device configured to (i) intercept first data from an originating device, the first data including a request for a uniform resource locator, (ii) determine whether the originating device is a wireless device, (iii) determine whether the originating device is in an authenticated state relative to the gateway device, and (iv) if the originating device is a wireless device and is not in the authenticated state, send second data to the originating device, the second data including a uniform resource locator redirection command to cause a browser executing on the originating device to launch an authentication application for authenticating the originating device relative to the gateway device by providing user-specific credential information to the gateway device; and
an authenticator communicatively coupled with the gateway device, configured to (i) receive the user-specific credential information from the originating device, and (ii) mark a network address of the originating device as being in the authenticated state based on a successful authentication of the user-specific credential information.

12. The system of claim 11, wherein the authenticator is configured to:
receive, from the originating device, a heartbeat message generated by the authentication application, and
maintain the authenticated state based on the heartbeat message.

13. The system of claim 12, wherein the network address is a first network address, and wherein the authenticator is configured to:
determine whether the heartbeat message indicates a second, different network address for the originating device, wherein the heartbeat message includes information associated with the user-specific credential information, and
mark the second network address as being in the authenticated state.

14. The system of claim 11, wherein the gateway device is configured to:
access a user agent field of the request, and
determine whether the user agent field indicates a wireless device category type.

15. The system of claim 11, wherein the gateway device is configured to determine whether the network address is a member of an address group assigned to a wireless local area network.

16. The system of claim 11, wherein the uniform resource locator redirection command redirects the browser to a website for downloading the authentication application if the authentication application has not been previously installed on the originating device.

17. The system of claim 11, wherein the authentication application is configured to operate in a background state on the originating device and to provide heartbeat messages to the gateway device to maintain the authenticated state.

18. The system of claim 11, wherein the authentication application is configured to cache the user-specific credential information and to automatically provide the user-specific credential information in response to a subsequent uniform resource locator redirection command.

19. The system of claim 11, wherein the user-specific credential information includes a username and a passphrase.

20. The system of claim 11, wherein the network address is in accordance with Internet Protocol (IP) version 4 or version 6.

21. The system of claim 11, comprising:
a server configured to provide the authentication application.

22. A system comprising:
a gateway device configured to (i) intercept first data from an originating device, the first data including a request for a uniform resource locator, (ii) determine whether the originating device is a personally-owned device, (iii) determine whether the originating device is in an authenticated state relative to the gateway device, and (iv) if the originating device is a personally-owned device and is not in the authenticated state, send second data to the originating device, the second data including a uniform resource locator redirection command to cause a browser executing on the originating device to launch an authentication application for authenticating the originating device relative to the gateway device by providing user-specific credential information to the gateway device; and
an authenticator communicatively coupled with the gateway device, configured to (i) receive the user-specific credential information from the originating device, and (ii) mark a network address of the originating device as being in the authenticated state based on a successful authentication of the user-specific credential information.

23. The system of claim 22, wherein the gateway device is configured to determine whether the network address is a member of an address group assigned to a subnet associated with personally-owned devices.

24. The system of claim 22, wherein the uniform resource locator redirection command redirects the browser to a website for downloading the authentication application if the authentication application has not been previously installed on the originating device.

* * * * *